US011155197B2

(12) United States Patent
Kirk (10) Patent No.: US 11,155,197 B2
(45) Date of Patent: Oct. 26, 2021

(54) LIFT STAND FOR VEHICLES AND TRAILERS

(71) Applicant: James Norman Kirk, Ballinger, TX (US)

(72) Inventor: James Norman Kirk, Ballinger, TX (US)

( * ) Notice: Subject to any disclaimer, the term of this patent is extended or adjusted under 35 U.S.C. 154(b) by 178 days.

(21) Appl. No.: 16/449,559

(22) Filed: Jun. 24, 2019

(65) Prior Publication Data

US 2019/0389357 A1     Dec. 26, 2019

Related U.S. Application Data

(60) Provisional application No. 62/689,763, filed on Jun. 25, 2018, provisional application No. 62/760,626, filed on Nov. 13, 2018.

(51) Int. Cl.
*B60P 1/04*     (2006.01)
*B60P 1/28*     (2006.01)

(52) U.S. Cl.
CPC .................... *B60P 1/283* (2013.01)

(58) Field of Classification Search
CPC .. B60P 1/283; B60P 1/045; B60P 1/34; B60P 1/28; B60S 9/02; B60S 2/12
USPC ................. 298/11, 19 B, 17 B, 17 S, 17 SG; 254/418, 423
See application file for complete search history.

(56) References Cited

U.S. PATENT DOCUMENTS

| 2,189,052 A | 2/1940 | Anthony |
| 2,345,789 A | 4/1944 | Lew |
| 2,465,244 A | 3/1949 | Lutz |
| 2,484,041 A | 10/1949 | Leary |
| 2,570,334 A | 10/1951 | Erjavec |
| 2,764,249 A | 9/1956 | Ronald |
| 2,792,210 A | 5/1957 | Starr |
| 2,971,661 A | 2/1961 | Isaacs |
| 3,336,080 A * | 8/1967 | Heck .................. B60P 1/18 |
| | | 298/17.5 |
| 3,433,457 A | 3/1969 | Ende |
| 3,606,249 A | 9/1971 | Pewthers |
| 4,047,699 A | 9/1977 | Wisdom |

(Continued)

OTHER PUBLICATIONS

"Howe Performance 2-stage Jack System", Oct. 30, 2017, 4 pages, Howe, www.howeperformance.com/howe-performance-2-stage-jack-system.

(Continued)

*Primary Examiner* — Stephen T Gordon
(74) *Attorney, Agent, or Firm* — Trop, Pruner & Hu, P.C.

(57) ABSTRACT

An embodiment includes first and second brackets to respectively couple to a trailer bed; first and second arms to respectively couple to the first and second brackets; wherein (a) in a first orientation the first arm is to couple to the bed non-orthogonally with the bed raised a first distance and with the first arm not extending below wheels of the trailer; (b) in a second orientation the first arm is to couple to the bed orthogonally with the bed being raised a second distance which is less than the first distance and with the first arm extending to a level of the bottom of the wheels, and (c) in a third orientation the first arm is to couple to the bed orthogonally with the bed being raised a third distance, which is between 0 inches and the second distance, and with the first arm extending below the wheels.

16 Claims, 6 Drawing Sheets

(56) References Cited

U.S. PATENT DOCUMENTS

| | | | |
|---|---|---|---|
| 4,576,390 A | | 3/1986 | Vos |
| 4,589,632 A | | 5/1986 | Smith |
| 5,219,429 A | | 6/1993 | Shelton |
| 5,702,089 A | | 12/1997 | Hurd |
| 6,079,742 A | | 6/2000 | Spence |
| 6,105,940 A | | 8/2000 | Charette |
| 6,224,040 B1 | | 5/2001 | Mejias et al. |
| 6,616,243 B2 | * | 9/2003 | Russell ............... B60S 9/10 298/17 SG |
| 6,895,648 B1 | | 5/2005 | Willett |
| 6,948,722 B2 | | 9/2005 | Sproatt et al. |
| 8,500,167 B2 | | 8/2013 | Diaz |
| 8,844,906 B2 | | 9/2014 | Idan |
| 10,532,688 B2 | * | 1/2020 | Richards ............... B60P 1/283 |
| 2005/0127343 A1 | * | 6/2005 | Jackson, Sr. ............ B60S 9/12 254/423 |
| 2016/0009256 A1 | | 1/2016 | Dondurur et al. |
| 2018/0170323 A1 | * | 6/2018 | Darius ............... B60S 9/12 |

OTHER PUBLICATIONS

"Stillwell Atlas 12K Direct Weld Hydraulic Jack Kit #-SJ-A001," Aug. 1, 2018, 3 pages, Bend Trailers, https://bendtrailers.com/stillwellatlas-12k-direct-weld-hydraulic-jack-kit-sj-a001.

"Pump on a Jack," Aug. 1, 2018, 5 pages, Johnson Trailer Parts, johnsontrailerparts.com, https://www.johnsontrailerparts.com/shop/pump-on-a-jack.

"Equalizer Systems 8107UPS AM Series Single Leg Hydraulic Trailer Jack with Manual Override Screw Drive—12,000 lbs," Jul. 8, 2014, 5 pages, RVupgrades, rvupgradestore.com/AM-Series-Single-Leg-Hydraulic-Trailer-Jack-p/8107ups.htm.

"Bigfoot 12K Hydraulic Landing Gear," Sep. 13, 2016, 4 pages, Bend Trailers, bendtrailers.com, https://web.archive.org/web/20160913120004/https://bendtrailers.com/bigfoot-12khydraulic-landing-gear-sqi24-i.

"HD Square Trailer Jacks—12,000 lbs," Aug. 1, 2018, 2 pages, Bulldog®, bulldogproducts.net, http://www.bulldogproducts.net/products/trailer-jacks/hd-square-jacks/hd-squaretrailer-jacks-12-000-lbs/USX3uVM!Va5Nxe0dVKnvLd6eqF7xrL5dwXt54obCII0=.

"Fastway Flip Automatic Fold-Up Jack Foot for 2" Jacks—6" Extension—1,400 lbs," Jul. 2018, 11 pages, etrailer.com®, etrailer.com, https://www.etrailer.com/Accessories-and-Parts/Fastway/FA88-00-6525.html.

"Glossary of the American tracking industry", Wikipedia, last edited on Jul. 30, 2018, 14 pages, https://en.wikipedia.org/wiki/glossary_of_the_American_trucking_industry.

"Premium Supply Double Hydraulic Trailer Jack Kit (24K) #PJC-2-K", downloaded Jul. 22, 2019, 3 pages, https://www.eastermarine.com/hydraulic-trailer-jack-kit-12k-pjc-2-k.

* cited by examiner

Figure 2. Lowered Bed To Install 2nd Pin
(Preventing further rotation of Lift Arm)

Figure 3. Maximum Lift

Figure 4

Figure 5. LIFT ARMS

LIFT STAND FOR VEHICLES AND TRAILERS

PRIORITY CLAIM

This application claims priority to U.S. Provisional Patent Application No. 62/689,763 filed on Jun. 25, 2018 and entitled "Axle Lift Stand for Hydraulic Tilt/Dump Bed Vehicles and Trailers", the content of which is hereby incorporated by reference. This application also claims priority to U.S. Provisional Patent Application No. 62/760,626 filed on Nov. 13, 2018 and entitled "Axle Lift Stand for Hydraulic Tilt/Dump Bed Vehicles and Trailers", the content of which is also hereby incorporated by reference.

TECHNICAL FIELD

An embodiment concerns a system for lifting, for example, a vehicle and/or trailer that has a tilt or dump bed (e.g., an electric or hydraulic powered tilt or dump bed). By lifting the vehicle and/or trailer with the lift system one may access and service tires, wheels, an axle and the like.

BACKGROUND

Trucks, trailers, and vehicles generally that have tilt or dump beds (e.g., an electric or hydraulic powered tilt or dump bed) are generally constructed to handle heavy loads of material for construction, agriculture, and the like. In order for such vehicles/trailers to fulfill these basic job requirements, they are generally constructed of strong, heavy steel or such material resulting in a tilt/dump vehicle/trailer that is very heavy, even when the tilt/dump vehicle/trailer is not loaded. Additionally, such a dump vehicle/trailer generally requires large heavy tires, wheels, and one or more axles in order to handle the loads they were designed for.

The heavy weight and loads of these tilt/dump vehicles/trailers require heavy duty hydraulic jacks in order to lift a tilt/dump vehicle/trailer for the purposes of changing flat tires, performing repairs, or other maintenance. It is not uncommon that such repairs and maintenance need to be performed in the field or on a work site, and in such event, any lifting jack must be sufficient to lift the tilt/dump vehicle/trailer when the dump bed is loaded to its maximum weight capacity.

Jacks with sufficient lifting capacity for this purpose are large and expensive, and are not generally carried on the tilt/dump vehicle/trailer. Consequently, they must be retrieved from another vehicle or from an off-site storage area, or a service truck that has sufficient jacks must be dispatched to the work site. These alternatives can result in extra expense and delays.

In addition to the expense of using such jacks, handling and positioning of such heavy jacks to safely stabilize the vehicle/trailer while repairs are being performed can be extremely dangerous and time consuming.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A and B" include situations with A, B, or A and B.

Based on the issues discussed above, Applicant determined there was a need for a simple, more compact, and safer lifting device to deal with the above disadvantages and problems in lifting both loaded and unloaded trucks, trailers, and other vehicles that have tilt/dump beds.

An embodiment provides a compact, simple, and safe method of lifting a truck, trailer, or other vehicle that has its own tilt/dump bed, by utilizing the existing lift system power (e.g., hydraulic power) of the tilt/dump vehicle/trailer without the need of additional jacks or hydraulic systems.

An embodiment addresses the instability, limited lift capacity, and expense of other lifting devices attached to the trailer or by using a separate jack not attached to the trailer.

An embodiment consists of lift arms that are attached to either side of the bed of the truck, trailer, or other vehicle. Each lift arm is attached by a strong bolt, pin, or similar member (e.g., rod, post, conduit) to a bracket that may be coupled (e.g., permanently welded and/or temporarily bolted) to the frame of the tilt/dump bed. The lift arm is attached to the bracket in a manner that allows the lift arm to rotate (e.g., rotate in a plane that is parallel to a long axis of the vehicle, the long axis of the vehicle extending from a front of the vehicle to a rear of the vehicle) so that the lift arm would be in a vertically straight position at maximum lift. The length of the lift arm may be long enough to lift the tires of the vehicle off of the ground to a sufficient height to perform maintenance when the hydraulic dump bed is fully lowered. In an embodiment the lift arms are not attached to the fixed bracket during normal hauling, tilting, or dumping operations.

In an embodiment, to lift a truck, trailer, or other vehicle that has an embodiment of the lift system attached to it, the bed may be raised, using its existing jack system (e.g., a hydraulic jack system), to a sufficient height to allow the lift arms to be pinned in position (or otherwise secured into position) on the bracket. At this point the lift arms can still rotate about the pin or other coupling member.

After the lift arms are pinned, the bed is lowered to a point where the lift arms are almost touching the ground, but can still rotate. At this point the lift arms are rotated to a perpendicular alignment with the bed and locked to the bracket by inserting a pin to prevent the lift arm from further rotation.

The bed is then lowered to its fully lowered position, thus lifting the wheels and tires off of the ground, and providing a stable stand to hold the dump vehicle/trailer while repairs and maintenance are being performed.

Upon completion of the repairs and maintenance to the tires, wheels, axles and the like, the bed may be raised until the lift arms no longer contact the ground. The lift arms may then be unpinned and removed from the fixed bracket and stored. The bed can then be returned to its fully lowered position.

The lift arms can be used on both sides of the dump vehicle/trailer to lift the entire axle (e.g., performing maintenance on the tires, wheels or axle), or the lift arm can be used on only one side of the dump vehicle/trailer to lift only one tire/wheel (e.g., changing a flat tire).

The lift arms can be made to a fixed length or can be adjustable by means of a bar that slides inside the primary bar (e.g., in a telescoping manner) that is attached to the fixed bracket on the frame of the dump bed. Adjustable lift arms have the added advantage of better stabilizing the hydraulic tilt/dump vehicle/trailer if it is located on uneven ground.

The size and strength of the lift arms and brackets may depend on the size and maximum load capacity of the hydraulic tilt/dump vehicle/trailer.

The storage requirements of the lift arms are significantly less than hydraulic jacks and can be easily stored in or on the dump vehicle/trailer for easy access.

An embodiment includes fixed brackets. Fixed brackets are attached (permanently welded or temporarily bolted) to the tilt/dump bed 401 of the dump vehicle/trailer (one on each side). In an embodiment (see FIG. 4) each bracket 405 has two or more ears (plates 411, 413) with apertures 430, 431 on each ear and spaced to allow the insertion of the lift arms and pin or pins to hold the lift arm between the braces. A weld plate 432 may couple to the ears via brace 433. Ears 411, 413 may couple to each other via plate 412.

Figure 5:
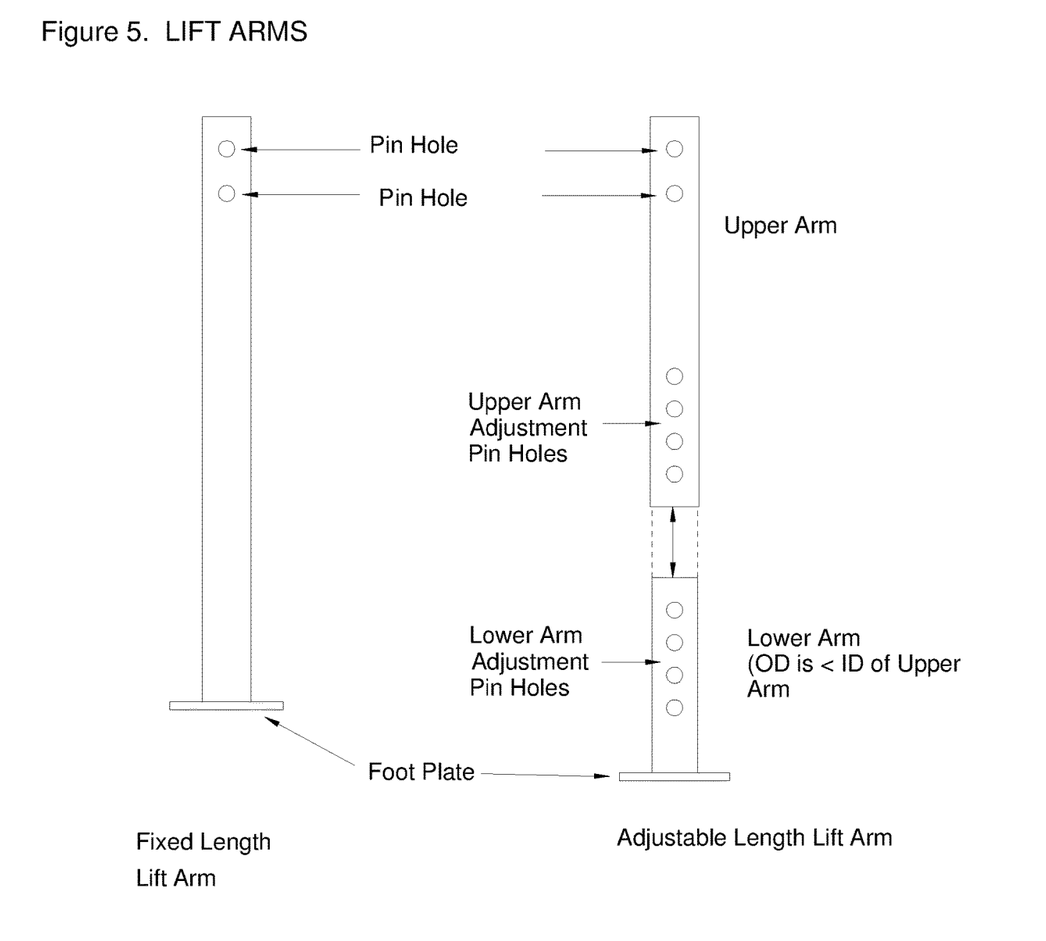
FIG. 5 shows embodiments of a fixed length lift arm and an adjustable length lift arm.

In varying embodiments lift arms can be fixed length or adjustable length. In an embodiment the length is at least 4 to 6 inches longer than the distance of the fixed bracket (center of pin holes) to the ground when the dump bed is in its fully lowered position and the dump vehicle/trailer is on level ground. (See FIG. 5).

In an embodiment the lift arm has a flat plate on one end that is perpendicular to the length of the lift arm, for contact with the ground. The other end of the lift arm fits between the ears of the bracket with a matching pin hole or holes that align with the pin hole or holes of the ears of the fixed bracket. (See FIG. 5, fixed length lift arm and adjustable length lift arm).

Lift arms may be constructed using, for example, round or square tubular steel or other such material. An adjustable lift arm may consist of at least two parts, the lower part sliding snuggly inside the top part (e.g., telescoping), with aligned holes that can be pinned to adjust the height. (See FIG. 5).

In an embodiment the braces are constructed using steel plate and the lift arms are constructed using square or round tubing. The steel plate and tubing size and strength may vary to meet the lift requirements of the weight, size, and maximum loads expected on the dump vehicle/trailer an embodiment is attached too.

As mentioned above, embodiments provide numerous advantages over conventional systems. A detailed discussion of some of those advantages now follows. Specifically, three conventional technologies (standard jacks, lifting arms/legs, rocking/rolling trailer jacks) are available to lift the tires and axles of a hydraulic tilt/dump bed trailer.

First, conventional hydraulic jacks can be used to lift a trailer by placing the jacks under the trailer at appropriate points. This uses the hydraulic power of the jacks to lift the trailer where it can be worked on. The disadvantages of this technology are that the jacks are separate from the trailer and thus not always readily available, are a separate expense, and can be unstable, especially on un-level ground or with a heavily loaded trailer. The shifting of a load or other activities that cause movement of the trailer can cause the jacks to fall out from under the trailer causing an accident. The jacks must also have sufficient power and strength to lift a fully loaded trailer, making them bulky, more cumbersome to carry, difficult to properly place under the trailer, and in some situations on-the-job situations may not be able to fit under the trailer.

However, embodiments address these issues. Since separate hydraulics are not required, the lift arms of an embodiment do not take up much room and can be easily carried as part of the trailer and thus always available. When in the fully pinned and locked position (e.g., see pins in apertures 130, 131 of FIG. 3), the lift arms of an embodiment become a solid part of the trailer and will not rotate or shift and are therefore inherently stable, even with a fully loaded trailer. An embodiment uses the power of the trailer and weight of the load to lift the trailer. Since the hydraulics of the trailer are built to specifications to handle the load capacity of the specific trailer, embodiments have sufficient power to lift the trailer, even fully loaded. Uneven ground is not as much of an issue with embodiments because the lift arms are solidly attached to the trailer. Also, since the lift arms are attached to the tilt-dump bed while it is in the raised position, there is no issue of being able to get the jack under the trailer.

Second, lifting arms/legs (e.g., U.S. Pat. No. 2,570,334 or 3,433,457) place lift legs on the back of the tilt-dump bed. These designs may work on tilt-dump beds that have a hinge point significantly forward of the rear of the tilt-dump bed. For example, such hinge points are located where the back wheels interface the trailer in U.S. Pat. No. 2,570,334 or 3,433,457. However, many modern dump/tilt trailers and trucks locate the tilt-hinge point much closer to the rear of the dump bed (e.g., see "tilt/hinge point" of FIG. 1), and under these conventional technologies there may not be sufficient leverage to lift the trailer/vehicle or provide enough lift height to raise the axles and wheels off the ground. With these technologies, the lift is performed by raising the tilt-dump bed while the lift arms are in place. The lift arms in these designs rotate and are not locked during the lifting operation. The raised position of the tilt-dump bed raises the center of gravity of the lifted vehicle/trailer making stability a serious issue, especially if the tilt-dump bed is loaded (and especially if the load shifts while the bed is raised). Also, these systems require hydraulic systems to be able to fully lift a loaded tilt/dump bed. In some circumstances, the hydraulic systems of these types of vehicles/trailers do not have hydraulic systems that are designed with this much power because with the forward hinge point less hydraulic power is necessary to tilt the bed for dumping or unloading and a fully loaded tilt-dump bed may be too heavy for the hydraulic system to fully lift off the ground.

However, embodiments address the shortcomings of this conventional technology. With an embodiment the lift arms are fully pinned and locked prior to lifting the trailer-vehicle, significantly reducing the dangers of shifting of the trailer both during the lifting operation and after the trailer-vehicle is loaded. With an embodiment the lift is performed when the tilt-dump bed is lowered and at the maximum desired lift the bed is in its fully lowered position. This creates a lower center of gravity with a significantly lower possibility of shifting during the lift and in the lifted position. Also, an embodiment uses the power of the trailer and the weight of the load to lift the trailer. Since the hydraulics of the trailer are built to specifications to handle the load capacity of the specific trailer, this promotes sufficient power to lift the trailer, even fully loaded.

Third, rocking/rolling trailer jacks are designed to lift a trailer by placing the device under an axle and when the trailer is rolled forward the "jack", having a variable circumference, raises the axle and wheel. These devices work on trailers and will not work (or have extreme difficulty working) on a dump or tilt bed vehicle where it is desired to raise the axles or wheels that are the drive train of the vehicle (i.e., it would not be able to move forward for the device to work). These devices are limited in that they would have to be extremely large and of sufficient strength to lift the heavy loaded tilt/dump beds in the forward motion required for the lift. These devices are further limited in that the lift utilizes the axle of the trailer to perform the lift; therefore, if repairs are necessary to an axle, especially if requiring the removal or replacement of the axle, the device would not be appropriate.

However, embodiments address the shortcomings of this design. In an embodiment the axle of the vehicle-trailer is not utilized in lifting and therefore repairs to an axle can be readily made. In an embodiment the lift is made relatively straight up and down using the hydraulic system and weight of the load, which means the lift system can therefore lift much heavier loads.

The following examples pertain to further embodiments.

Example 1 includes a system comprising: a trailer having wheels, a trailer frame, and a bed frame, the trailer frame being pivotably coupled to the bed frame at a pivot; a first bracket coupled a first side of the bed frame and a second bracket coupled to a second side of the bed frame, the first side of the bed frame being opposite the second side of the bed frame; a first arm coupled to the first bracket via a first pivot; a second arm coupled to the second bracket via a second pivot; wherein (a) in a first orientation the first arm dynamically couples to the first side of the bed frame non-orthogonally, the bed frame is raised away from the trailer frame a first distance, and the first arm does not extend below the wheels; (b) in a second orientation the first arm statically couples, in a locked manner, to the first side of the bed frame orthogonally, the bed frame is raised away from the trailer frame a second distance which is less than the first distance, and the first arm extends to a level of the bottom of the wheels, and (c) in a third orientation the first arm statically couples, in the locked manner, to the first side of the bed frame orthogonally, the bed frame is raised away from the trailer frame a third distance, which is between 0 inches and the second distance, and the first arm extends below the wheels.

Figure 1:
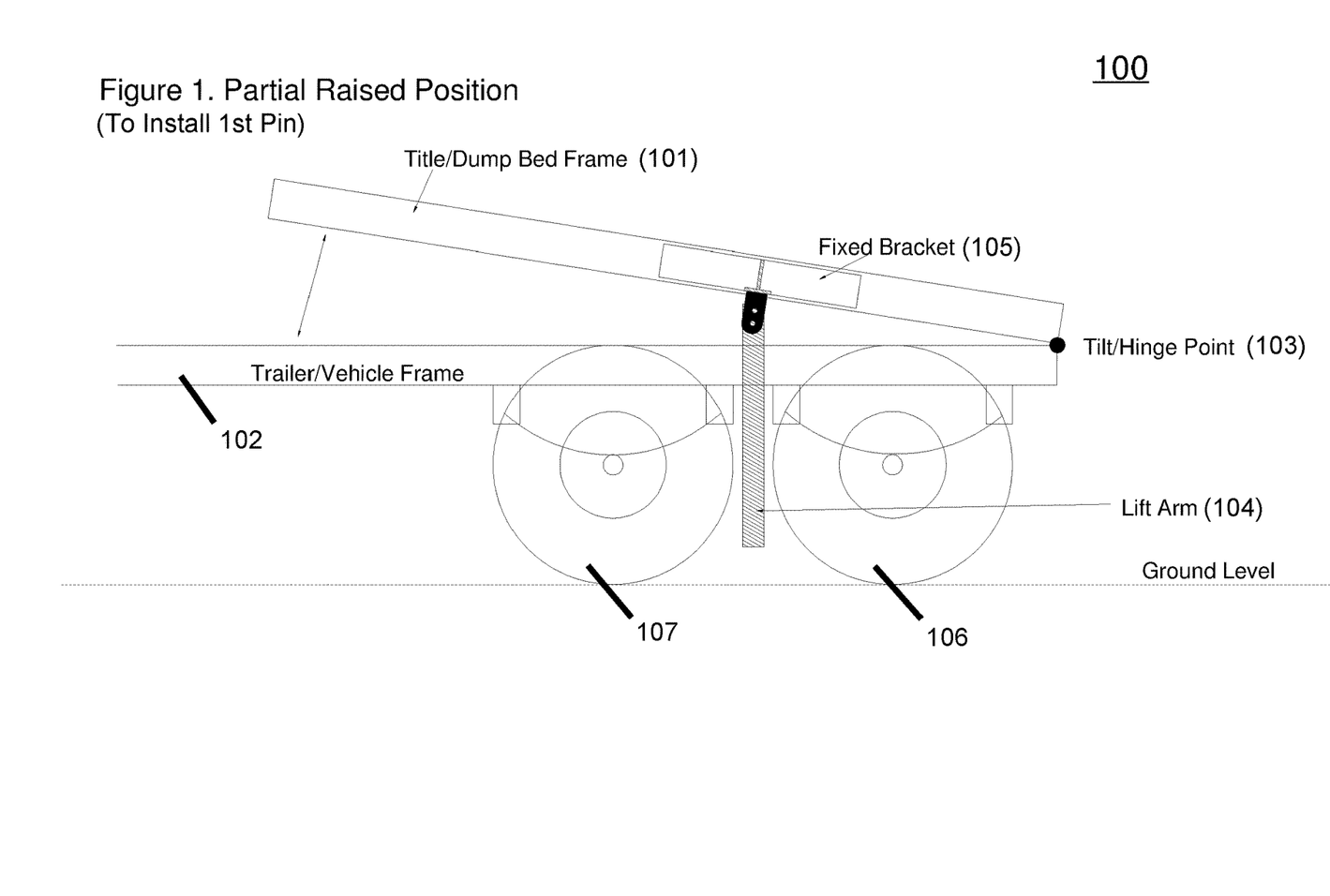
FIG. 1 shows an embodiment of a tilt/dump bed in a partially raised position to allow one or more lift arms to be installed.

For instance, in FIG. 1 the arm dynamically pivots with regard to the trailer frame. However, in FIGS. 2 and 3 the arm is statically coupled (i.e., locked) to the trailer frame. FIG. 1 presents a system 100 with bed frame 101 coupled to trailer frame 102 via pivot 103. Arm 104 couples to frame 101 via bracket 105. Arm 104 is between wheels 106, 107. In FIG. 4, use of pin hole 430 (without using pin hole 431) allows for the dynamic coupling of the first orientation described above and use of both holes 430, 431 allows for the static orientation of the second and third orientations described above.

Example 1 discusses a "trailer". The term "trailer" is to be construed broadly. For instance, a "trailer" is not limited to a non-motorized vehicle that must be hitched to a motorized vehicle. For example, in the context of Example 1 a dump truck or cement truck are still said to have a trailer component even though there is primarily a single chassis that couples the dump truck's front wheels to the dump truck's rear wheels.

In various embodiments described herein a first pin (such as a pin for aperture 430) may be used to allow the arm 404 to pivot and then a second pin (such as a pin for aperture 431) may be used to lock the arm in place. In other words, pin 431 is inserted after pin 430. However, in other embodiments the second pin (such as a pin for aperture 431) may be used to allow pivoting while the first pin (such as a pin for aperture 430) may be used to lock the arm in place.

Example 2. The system of example 1 wherein: the pivot, which couples the trailer frame to the bed frame, is positioned between the wheels and a back end of the trailer; the wheels are between a front end of the trailer and the back end of the trailer.

Figure 2:
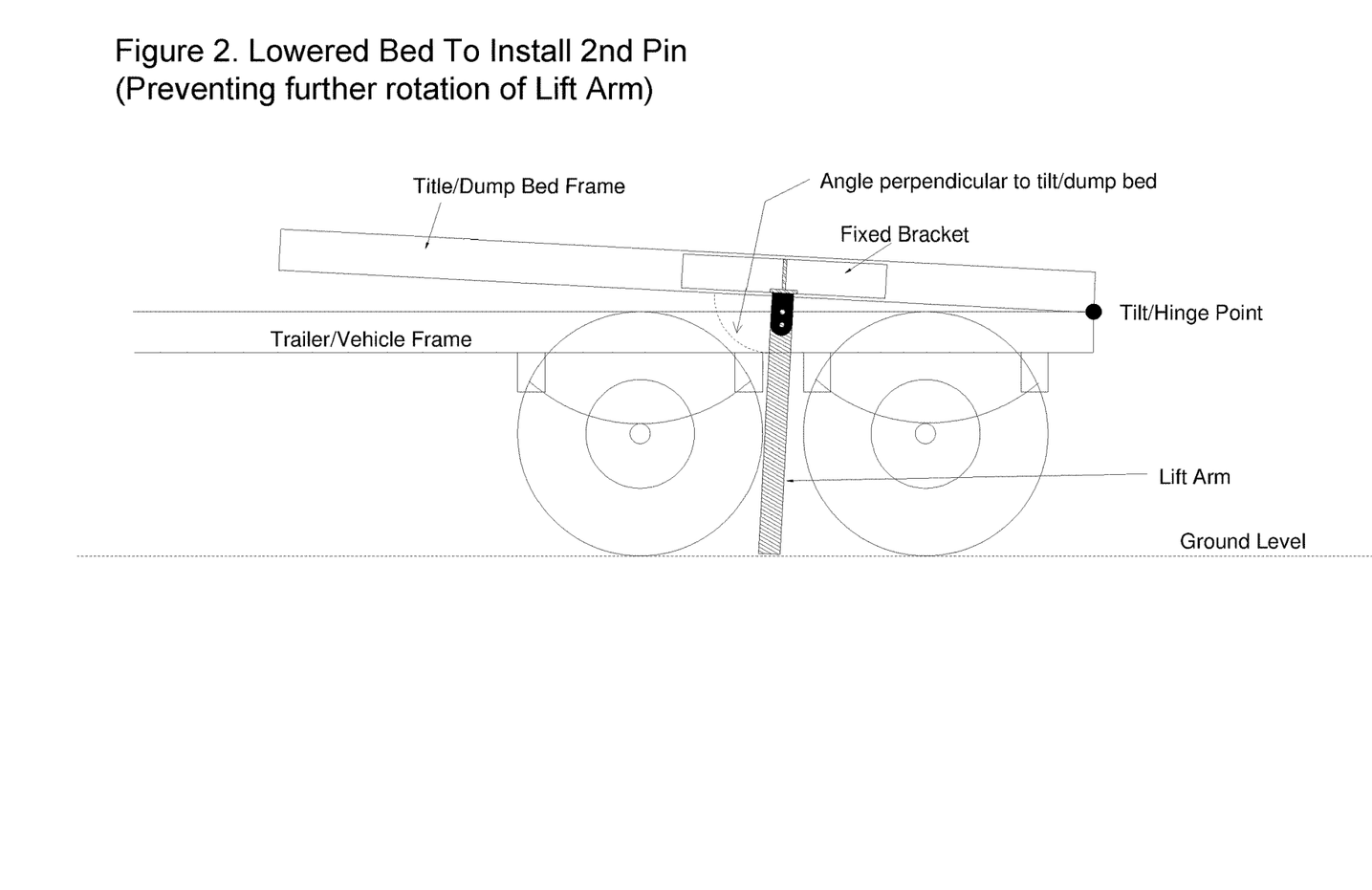
FIG. 2 shows the embodiment of FIG. 1 with the bed lowered sufficiently to align the lift arm perpendicular to the bed and allow a pin to be inserted into a cooperating aperture to prevent further rotation of the arm.

For instance, see FIG. 2. Thus, a pivot at the rearmost portion of the trailer frame is still "between" the back end of the trailer and the wheel. In FIG. 2, the back end of the trailer is to the right in the figure and the front end of the trailer is to the left in the figure.

Example 3. The system of example 2 wherein the first arm is between the wheels and the front end of the trailer.

Example 4. The system of example 3 wherein: the trailer comprises additional wheels; the first arm is between the wheels and the additional wheels.

Example 5. The system of example 4 wherein: the first arm includes a long axis; in the third orientation an additional axis is orthogonal to the long axis of the first arm; the additional axis intersects at least one of the wheels, at least one of the additional wheels, and the first arm.

In an embodiment the ability for the first arm to pivotably couple to the first bracket can be critical. For example, when the first arm goes between two wheels this may not be possible if there the arm is not pivotably coupled to the bracket. For example, in FIG. 1 if the arm were already orthogonally coupled to the bracket (and the arm is to be intersected by the additional axis of Example 4') then a lower portion of the arm would intersect the forward wheel seen in FIG. 1. In other words, the forward wheel would prohibit a user from affixing the arm to the bracket.

Figure 3:
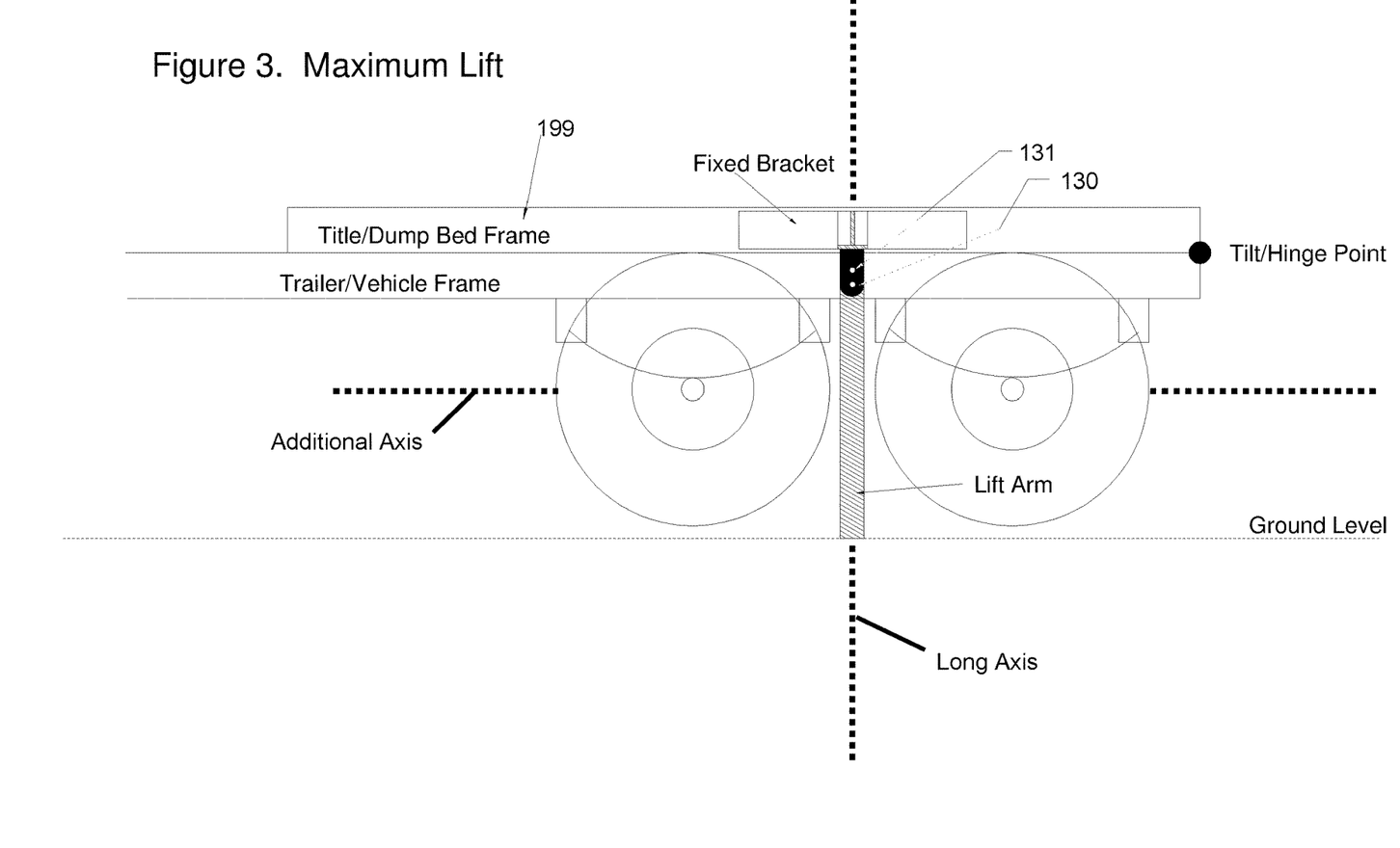
FIG. 3 shows the embodiment of FIG. 1 with the bed in the fully lowered position providing the maximum lift.
Figure 4:
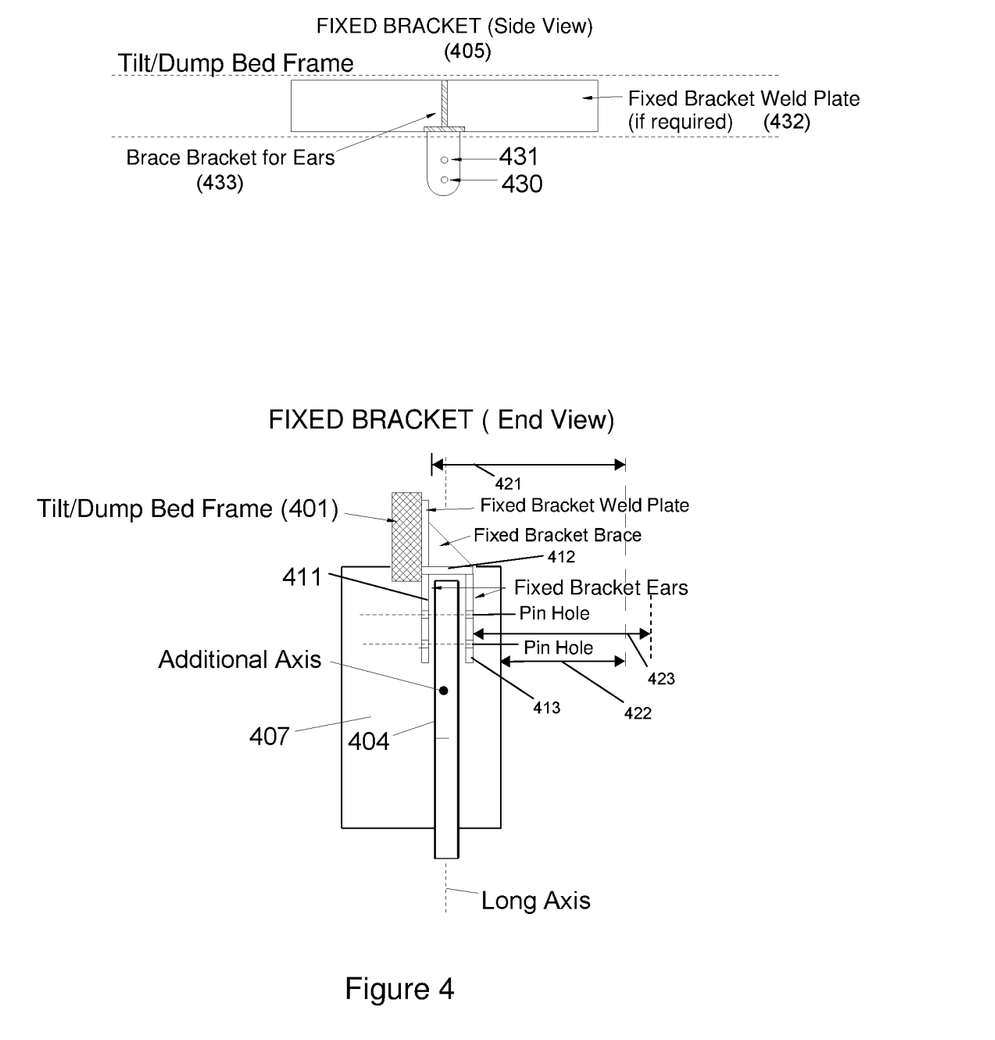
FIG. 4 shows front and side views of an embodiment of a bracket.

However, in other embodiments the arm is not necessarily located between wheels and a bracket and corresponding arm may be located at, for example, location 199 of FIG. 3.

FIG. 3 depicts, in an embodiment, a "long axis" and an "additional axis". FIG. 4 depicts, in an embodiment, a "long axis" and an "additional axis".

Example 6. A method comprising: with a trailer having wheels contacting a ground surface, a trailer frame, and a bed frame, rotating the bed frame away from trailer frame via a pivot that couples the trailer frame to the bed frame; with a first bracket coupled a first side of the bed frame and a second bracket coupled to a second side of the bed frame, the first side of the bed frame being opposite the second side of the bed frame; statically and orthogonally coupling a first arm to the first bracket via a first pivot and statically and orthogonally coupling a second arm to the second bracket via a second pivot; with the first arm statically and orthogonally coupled to the first bracket and the second arm statically and orthogonally coupled to the second bracket, lowering the bed frame towards trailer frame; in response to lowering the bed frame towards the trailer frame, moving a bottom portion of the first arm and a bottom portion of the second arm below the wheels; in response to moving the bottom portion of the first arm below the wheels and the bottom portion of the second arm below the wheels, raising the wheels off of the ground surface.

Another version of Example 6. A method comprising: with a trailer having wheels contacting a ground surface, a trailer frame, and a bed frame, using hydraulic power to rotate the bed frame away from trailer frame via a pivot that couples the trailer frame to the bed frame; with a first bracket coupled a first side of the bed frame and a second bracket coupled to a second side of the bed frame, the first side of the bed frame being opposite the second side of the bed frame; statically and orthogonally coupling a first arm to the first bracket via a first pivot and statically and orthogonally coupling a second arm to the second bracket via a second pivot; with the first arm statically and orthogonally coupled to the first bracket and the second arm statically and orthogonally coupled to the second bracket, using hydraulic power to lower the bed frame towards trailer frame; in response to lowering the bed frame towards the trailer frame, moving a bottom portion of the first arm and a bottom portion of the second arm below the wheels; in response to moving the bottom portion of the first arm below the wheels and the bottom portion of the second arm below the wheels, raising the wheels off of the ground surface.

Example 7. A system comprising: a first bracket configured to couple a first side of a bed frame of a trailer having wheels; a second bracket configured to couple to a second side of the bed frame, the first side of the bed frame being opposite the second side of the bed frame; a first arm configured to couple to the first bracket via a first pivot; a second arm configures to couple to the second bracket via a second pivot; wherein (a) in a first orientation the first arm is configured to dynamically couple to the first side of the bed frame non-orthogonally with the bed frame raised away from a trailer frame a first distance and with the first arm not extending below the wheels; the trailer frame being pivotably coupled to the bed frame at a pivot; (b) in a second orientation the first arm is configured to statically couple, in a locked manner, to the first side of the bed frame orthogonally with the bed frame being raised away from the trailer frame a second distance which is less than the first distance and with the first arm extending to a level of the bottom of the wheels, and (c) in a third orientation the first arm is configured to statically couple, in the locked manner, to the first side of the bed frame orthogonally with the bed frame being raised away from the trailer frame a third distance, which is between 0 inches and the second distance, and with the first arm extending below the wheels.

Thus, an embodiment may include a kit with brackets and arms. Such a kit may be used to modify a trailer. While the Example provides the brackets are "configured to" couple to first and second sides of the bed frame, that does not necessarily mean the brackets must be different from each other and may in fact be the same as one another.

Example 8. A system comprising: a vehicle having wheels, a vehicle frame, and a bed frame, the vehicle frame being pivotably coupled to the bed frame at a pivot; a first bracket coupled a first side of the bed frame and a second bracket coupled to a second side of the bed frame, the first side of the bed frame being opposite the second side of the bed frame; a first arm coupled to the first bracket via a first pivot; a second arm coupled to the second bracket via a second pivot; wherein (a) in a first orientation the first arm dynamically couples to the first side of the bed frame non-orthogonally, the bed frame is raised away from the vehicle frame a first distance, and the first arm does not extend below the wheels; (b) in a second orientation the first arm statically couples, in a locked manner, to the first side of the bed frame orthogonally, the bed frame is raised away from the vehicle frame a second distance which is less than the first distance, and the first arm extends to a level of the bottom of the wheels, and (c) in a third orientation the first arm statically couples, in the locked manner, to the first side of the bed frame orthogonally, the bed frame is raised away from the vehicle frame a third distance, which is between 0 inches and the second distance, and the first arm extends below the wheels.

Such a vehicle includes dump trucks, cement mixers, bottom dump trailers, container trailers, flatbed trailers, semi-truck and/or only the trailer portion of the semi-truck. As used herein, a semi-truck (also known as a tractor-trailer) is an articulated (jointed) combination vehicle (e.g., composed of a 10-wheeled (three axle) tractor and a 4-wheeled (two axle) trailer). The components of a semi-truck are varied. For example, there are two axle tractors, single axle trailers, and combinations with extra lift axles. In some applications a semi can pull additional full trailers (doubles and triples) with the use of a single axle or tandem axle converter dolly. The use of the term "semi" in the name comes from the semi-trailer, a vehicle whose load is carried partly by its own axles and partly by the pulling vehicle, which is commonly included in tractor-trailer rigs.

Example 9. A system comprising: a trailer having wheels, a trailer frame, and a bed frame, the trailer frame being pivotably coupled to the bed frame at a pivot; a first bracket coupled a first side of the bed frame and a second bracket coupled to a second side of the bed frame, the first side of the bed frame being opposite the second side of the bed frame; a first arm coupled to the first bracket; a second arm coupled to the second bracket; wherein (a) in a first orientation the first arm couples, in a locked manner, to the first side of the bed frame orthogonally, the bed frame is raised away from the trailer frame a first distance, and the first arm does not extend below the wheels; (b) in a second orientation the first arm couples, in a locked manner, to the first side of the bed frame orthogonally, the bed frame is raised away from the trailer frame a second distance which is less than the first distance, and the first arm extends to a level of the bottom of the wheels, and (c) in a third orientation the first arm couples, in the locked manner, to the first side of the bed frame orthogonally, the bed frame is raised away from the trailer frame a third distance, which is between 0 inches and the second distance, and the first arm extends below the wheels.

Thus, a distance of "0 inches" or "0 mm" or "0 microns" and the like is still considered a distance as used herein.

Example 10. The system of example 9 wherein: the trailer comprises additional wheels; the first arm is between the wheels and the additional wheels.

Example 11. The system of example 10 wherein: the first arm includes a long axis; in the third orientation an additional axis is orthogonal to the long axis of the first arm; and the additional axis intersects at least one of the wheels, at least one of the additional wheels, but does not intersect the first arm.

Thus, in contrast to Example 4', in an embodiment, plate 411 may extend out distance 421 and plate 413 may extend out distance 423. As a result, arm 404 may be located between the plates with a clearance distance 422 from tire 407. In such an embodiment a need for the first arm to pivotably couple to bracket may be diminished because the tire would not be an obstacle when lowering a bed to which the bracket is coupled.

In an embodiment, a bracket may have a hinge that allows it to deploy from distance adjacent to frame 401 out to a distance such as, for example, distance 421.

Example 12. A system comprising: a trailer having wheels, a trailer frame, and a bed frame, the trailer frame being pivotably coupled to the bed frame at a pivot; a first trailer portion on a first side of the bed frame and a second trailer portion on a second side of the bed frame, the first side of the bed frame being opposite the second side of the bed frame; a first arm coupled to the first trailer portion via a first pivot; a second arm coupled to the second trailer portion via a second pivot; wherein (a) in a first orientation the first arm dynamically couples to the first side of the bed frame non-orthogonally, the bed frame is raised away from the trailer frame a first distance, and the first arm does not extend below the wheels; (b) in a second orientation the first arm statically couples, in a locked manner, to the first side of the bed frame orthogonally, the bed frame is raised away from the trailer frame a second distance which is less than the first distance, and the first arm extends to a level of the bottom of the wheels, and (c) in a third orientation the first arm statically couples, in the locked manner, to the first side of the bed frame orthogonally, the bed frame is raised away from the trailer frame a third distance, which is between 0 inches and the second distance, and the first arm extends below the wheels.

Figure 6:
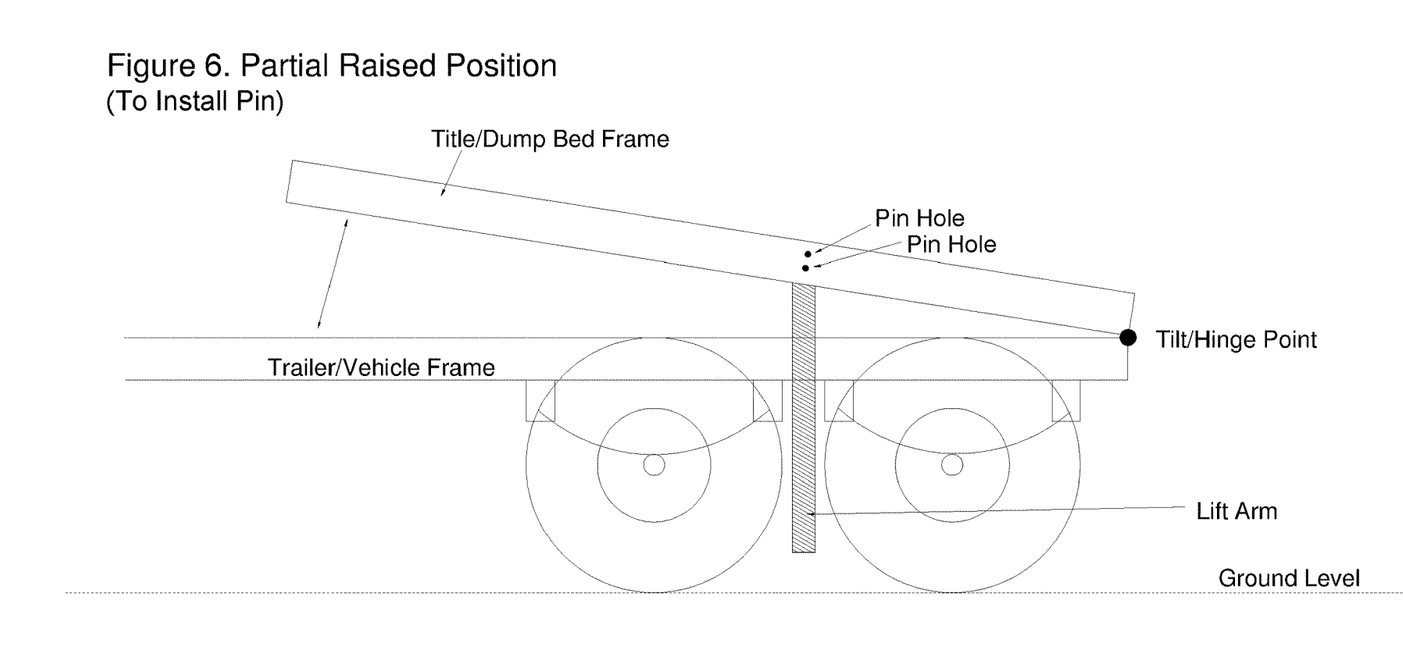
FIG. 6 includes an embodiment of a lifting system.

Thus, in some embodiments an "after-market" bracket such as, for example, the bracket of FIG. 4. The bracket may be used to "retrofit" trailers already in service. However, in other embodiments such as Example 12 the trailer may be modified (after market or when newly produced) without need for such a bracket. For example, FIG. 6 shows an embodiment wherein a sidewall of the bed frame has at least one aperture for at least one pin.

Example 13. The system of example 12 wherein: the pivot, which couples the trailer frame to the bed frame, is positioned between the wheels and a back end of the trailer; the wheels are between a front end of the trailer and the back end of the trailer.

Example 14. The system of example 13 wherein the first arm is between the wheels and the front end of the trailer.

Example 15. The system of example 14 wherein: the trailer comprises additional wheels; the first arm is between the wheels and the additional wheels.

Example 16. The system of example 15 wherein: the first arm includes a long axis; in the third orientation an additional axis is orthogonal to the long axis of the first arm; and the additional axis intersects at least one of the wheels, at least one of the additional wheels, and the first arm.

Example 17. A system comprising: a trailer having wheels, a trailer frame, and a bed frame, the trailer frame being pivotably coupled to the bed frame at a pivot; a first bracket coupled a first side of the bed frame; a first arm coupled to the first bracket via a first pivot; wherein (a) in a first orientation the first arm dynamically couples to the first side of the bed frame non-orthogonally, the bed frame is raised away from the trailer frame a first distance, and the first arm does not extend below the wheels; (b) in a second orientation the first arm statically couples, in a locked manner, to the first side of the bed frame orthogonally, the bed frame is raised away from the trailer frame a second distance which is less than the first distance, and the first arm extends to a level of the bottom of the wheels, and (c) in a third orientation the first arm statically couples, in the locked manner, to the first side of the bed frame orthogonally, the bed frame is raised away from the trailer frame a third distance, which is between 0 inches and the second distance, and the first arm extends below the wheels.

Thus, an embodiment may not necessarily require two or more brackets or two or more arms. A single arm may be used to lift a single side of an object. Other embodiments may include more than two arms. For example, to distribute weight more evenly an embodiment may include an additional arm at location 199 and other arms may be situated at other locations with or without an arm in the location shown in FIG. 3.

Example 18. The system of example 17 wherein: the pivot, which couples the trailer frame to the bed frame, is positioned between the wheels and a back end of the trailer; the wheels are between a front end of the trailer and the back end of the trailer.

Example 19. The system of example 18 wherein the first arm is between the wheels and the front end of the trailer.

Example 20. The system of example 19 wherein: the trailer comprises additional wheels; the first arm is between the wheels and the additional wheels.

Example 21. The system of example 20 wherein: the first arm includes a long axis; in the third orientation an additional axis is orthogonal to the long axis of the first arm; and the additional axis intersects at least one of the wheels, at least one of the additional wheels, and the first arm.

Example 22. A system comprising: a trailer having a hydraulic energy source, wheels, a trailer frame, and a bed frame, the trailer frame being pivotably coupled to the bed frame at a pivot; a first bracket coupled a first side of the bed frame and a second bracket coupled to a second side of the bed frame, the first side of the bed frame being opposite the second side of the bed frame; a first arm coupled to the first bracket via a first pivot; a second arm coupled to the second bracket via a second pivot; wherein (a) in a first orientation the first arm dynamically couples to the first side of the bed frame non-orthogonally, the bed frame is raised, via the hydraulic energy source, away from the trailer frame a first distance, and the first arm does not extend below the wheels; (b) in a second orientation the first arm statically couples, in a locked manner, to the first side of the bed frame orthogonally, the bed frame is raised, via the hydraulic energy source, away from the trailer frame a second distance which is less than the first distance, and the first arm extends to a level of the bottom of the wheels, and (c) in a third orientation the first arm statically couples, in the locked manner, to the first side of the bed frame orthogonally, the bed frame is raised, via the hydraulic energy source, away from the trailer frame a third distance, which is between 0 inches and the second distance, and the first arm extends below the wheels.

Thus, an embodiment uses hydraulic lift system to raise and/or lower the bed and consequently lower/lift the trailer. However, in other embodiments an electric lift system may be used to raise and/or lower the bed and consequently lower/lift the trailer. In other embodiments a manual lift system may be used to raise and/or lower the bed and consequently lower/lift the trailer. While energy systems may vary in the particular embodiments discussed in this paragraph, those same embodiments still rely on a lowering of the bed to raise the trailer.

Example 23. The system of Example 22 wherein: the pivot, which couples the trailer frame to the bed frame, is positioned between the wheels and a back end of the trailer; the wheels are between a front end of the trailer and the back end of the trailer.

Example 24. The system of Example 23 wherein the first arm is between the wheels and the front end of the trailer.

Example 25. The system of Example 24 wherein: the trailer comprises additional wheels; the first arm is between the wheels and the additional wheels.

Example 26. The system of Example 25 wherein: the first arm includes a long axis; in the third orientation an additional axis is orthogonal to the long axis of the first arm; and the additional axis intersects at least one of the wheels, at least one of the additional wheels, and the first arm.

Example 27. The system of Example 4 wherein: the first arm includes a long axis; in the third orientation an additional axis is orthogonal to the long axis of the first arm; and the additional axis intersects at least one of the wheels, at least one of the additional wheels, but does not intersect the first arm.

For example, the arms may be spread out at distance 421 of FIG. 4.

Example 28. A system wherein in the third orientation the wheels and the additional wheels are between the first and second arms.

For example, the arms may be spread out at distance 421 of FIG. 4.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a surface of a device is the "top" surface of that device; the device may actually be in any orientation so that a "top" side of a device may be lower than the "bottom" side of the device in a standard terrestrial frame of reference and still fall within the meaning of the term "top." The term "on" as used herein (including in the claims) does not indicate that a first object "on" a second object is directly on and in immediate contact with the second object unless such is specifically stated; there may be a third object or other structure between the first object and the second object. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A system comprising:
    a trailer having wheels, a trailer frame, and a bed frame, the trailer frame being pivotably coupled to the bed frame at a pivot;
    a first bracket coupled a first side of the bed frame and a second bracket coupled to a second side of the bed frame, the first side of the bed frame being opposite the second side of the bed frame;
    a first arm coupled to the first bracket via a first pivot;
    a second arm coupled to the second bracket via a second pivot;
    wherein (a) in a first orientation the first arm dynamically couples to the first side of the bed frame non-orthogonally, the bed frame is raised away from the trailer frame a first distance, and the first arm does not extend below the wheels; (b) in a second orientation the first arm statically couples, in a locked manner, to the first side of the bed frame orthogonally, the bed frame is raised away from the trailer frame a second distance which is less than the first distance, and the first arm extends to a level of the bottom of the wheels, and (c) in a third orientation the first arm statically couples, in the locked manner, to the first side of the bed frame orthogonally, the bed frame is raised away from the trailer frame a third distance, which is between 0 inches and the second distance, and the first arm extends below the wheels.

2. The system of claim 1 wherein:
    the pivot, which couples the trailer frame to the bed frame, is positioned between the wheels and a back end of the trailer;
    the wheels are between a front end of the trailer and the back end of the trailer.

3. The system of claim 2 wherein the first arm is between the wheels and the front end of the trailer.

4. The system of claim 3 wherein:
    the trailer comprises additional wheels;
    the first arm is between the wheels and the additional wheels.

5. The system of claim 4 wherein:
    the first arm includes a long axis;
    in the third orientation an additional axis is orthogonal to the long axis of the first arm; and
    the additional axis intersects at least one of the wheels, at least one of the additional wheels, and the first arm.

6. The system of claim 4 wherein:
    the first arm includes a long axis;
    in the third orientation an additional axis is orthogonal to the long axis of the first arm; and
    the additional axis intersects at least one of the wheels and at least one of the additional wheels;
    the additional axis does not intersect the first arm.

7. The system of claim 6 wherein in the third orientation the wheels and the additional wheels are between the first and second arms.

8. A system comprising:
    a vehicle having wheels, a vehicle frame, and a bed frame, the vehicle frame being pivotably coupled to the bed frame at a pivot;
    a first bracket coupled a first side of the bed frame and a second bracket coupled to a second side of the bed frame, the first side of the bed frame being opposite the second side of the bed frame;
a first arm coupled to the first bracket via a first pivot;
a second arm coupled to the second bracket via a second pivot;
wherein (a) in a first orientation the first arm dynamically couples to the first side of the bed frame, the bed frame is raised away from the vehicle frame a first distance, and the first arm does not extend below the wheels; (b) in a second orientation the first arm statically couples to the first side of the bed frame, the bed frame is raised away from the vehicle frame a second distance which is less than the first distance, and the first arm extends to a level of the bottom of the wheels, and (c) in a third orientation the first arm statically couples to the first side of the bed frame, the bed frame is raised away from the vehicle frame a third distance, which is between 0 inches and the second distance, and the first arm extends below the wheels.

9. The system of claim 8 wherein:
the pivot, which couples the vehicle frame to the bed frame, is positioned between the wheels and a back end of the trailer;
the wheels are between a front end of the vehicle and the back end of the vehicle.

10. The system of claim 9 wherein the first arm is between the wheels and the front end of the vehicle.

11. The system of claim 10 wherein:
the vehicle comprises additional wheels;
the first arm is between the wheels and the additional wheels.

12. The system of claim 11 wherein:
the first arm includes a long axis;
in the third orientation an additional axis is orthogonal to the long axis of the first arm; and
the additional axis intersects at least one of the wheels, at least one of the additional wheels, and the first arm.

13. The system of claim 11 wherein:
the first arm includes a long axis;
in the third orientation an additional axis is orthogonal to the long axis of the first arm; and
the additional axis intersects at least one of the wheels and at least one of the additional wheels;
the additional axis does not intersect the first arm.

14. The system of claim 13 wherein in the third orientation the wheels and the additional wheels are between the first and second arms.

15. A system comprising:
a first bracket configured to couple to a first side of a bed frame of a trailer having wheels;
a second bracket configured to couple to a second side of the bed frame, the first side of the bed frame being opposite the second side of the bed frame;
a first arm configured to couple to the first bracket via a first pivot;
a second arm configured to couple to the second bracket via a second pivot;
wherein (a) in a first orientation the first arm is configured to dynamically couple to the first side of the bed frame with the bed frame raised away from a trailer frame a first distance and with the first arm not extending below the wheels; the trailer frame being pivotably coupled to the bed frame at a pivot; (b) in a second orientation the first arm is configured to statically couple, in a locked manner, to the first side of the bed frame with the bed frame being raised away from the trailer frame a second distance which is less than the first distance and with the first arm extending to a level of the bottom of the wheels, and (c) in a third orientation the first arm is configured to statically couple, in the locked manner, to the first side of the bed frame with the bed frame being raised away from the trailer frame a third distance, which is between 0 inches and the second distance, and with the first arm extending below the wheels.

16. The system of claim 15 comprising first, second, third, and fourth pins, wherein:
the first pivot includes the first pin and the second pivot includes the second pin;
the first arm is configured to dynamically couple to the first bracket via the first pin;
the second arm is configured to dynamically couple to the second bracket via the second pin;
the first arm is configured to statically couple to the first bracket via the third pin;
the second arm is configured to statically couple to the second bracket via the fourth pin.

\* \* \* \* \*